Patented Dec. 18, 1951

2,578,950

UNITED STATES PATENT OFFICE 2,578,950

UNSATURATED ESTERS OF t-BUTYL BENZOIC ACID, THEIR POLYMERS, AND COMPOSITIONS

James R. Scheibli, San Lorenzo, Rupert C. Morris, Berkeley, and Edward C. Shokal, Oakland, Calif., assignors to Shell Development Company, San Francisco, Calif., a corporation of Delaware No Drawing. Application May 27, 1949,
Serial No. 95,868

19 Claims. (Cl. 260—17)

This invention relates to the provision of novel unsaturated esters of quaternary-substituted benzoic acids and to the polymers and compositions formed therewith.

The ester monomers of the present invention are exemplified by vinyl p-tert-butylbenzoate, allyl p-tert-butylbenzoate, and methallyl p-tert-amylbenzoate, and may be represented by the structural formula

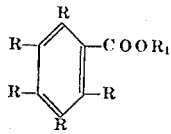

wherein one of the R's is a substituted or unsubstituted aliphatic radical containing not less than 4 carbon atoms, one of which is a quaternary carbon atom linked directly to the benzyl nucleus, as represented by the tertiary butyl, tertiary amyl, 1,1-dimethylpropen-2-yl, 1,1-dimethylbuten-2-yl, 1,1-dimethyl-3-chloropropyl, and 1,1-dimethyl-2-chlorobuten-3-yl radicals, and the remaining R's are hydrogen atoms or alkyl radicals, as methyl, ethyl, isobutyl, n-pentyl, or n-heptyl, for example, and wherein $R_1$ is a substituted or unsubstituted aliphatic radical containing one or more olefinic double bonds, as represented by the vinyl, allyl, methallyl, isopropenyl, 1,3-pentadienyl, crotyl, chloroallyl, chloromethallyl, and like radicals.

A preferred group of esters is that having the structural formula

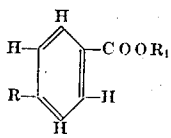

wherein R is an alkyl radical of from 4 to 20 carbon atoms including a quaternary carbon atom linked directly to the benzyl nucleus, as represented by the tertiary butyl, tertiary amyl, 1,1-dimethylbutyl, 1-methyl-1-ethylpentyl, 1,1-dimethyloctyl, 1-methyl-1-ethyldecyl, and 1-methyl-1-ethylheptadecyl radicals, and wherein $R_1$ is a monovalent alkenyl radical of from 4 to 20 atoms, the free valency of which is on a saturated carbon atom directly attached to a second carbon atom which in turn is joined to a third carbon atom by an olefinic double bond. Representative radicals of this preferred type for $R_1$ are the allyl, vinyl, methallyl, ethallyl, crotyl, tiglyl, 2-pentadecenyl, 2-octadecenyl, and 2-eicosenyl.

Compounds which are representative of the novel compositions of the present invention are monomeric and polymeric:

Vinyl p-tert-butylbenzoate
Vinyl m-tert-butylbenzoate
Vinyl o-tert-butylbenzoate
Vinyl p-1,1-dimethylbuten-3-ylbenzoate
Allyl p-tert-butylbenzoate
Allyl m-tert-butylbenzoate
Allyl o-tert-butylbenzoate
Allyl 1,1-dimethylpropen-2-ylbenzoate
Methallyl p-tert-butylbenzoate
Methallyl m-tert-butylbenzoate
Methallyl o-tert-butylbenzoate
Allyl p-tert-amylbenzoate
Vinyl p-tert-amylbenzoate
Methallyl p-tert-amylbenzoate
Vinyl o-tert-amylbenzoate
Allyl 2-methyl-4-tert-butylbenzoate
Allyl 3 - methyl - 4 - (1,1 - dimethylpropen-2-yl) - benzoate
2-decenyl p-tert-butylbenzoate
4-ethylhepten-2-yl p-tert-butylbenzoate
Methallyl-2-isopropyl-3-tert-amylbenzoate
Allyl p-(1-methyl-1-ethylheptadecyl)-benzoate
Chloroallyl p-tert-butylbenzoate
4-chloropenten-2-yl p-tert-butylbenzoate
4 - bromo-5-hydroxydecen-2-yl p-tert-butylbenzoate The novel esters of the invention may be prepared by any method adapted to the preparation of such compounds. For example, they are readily prepared by the direct esterification of a tertiary-alkyl-substituted benzoic acid with allyl, or an allyl-type alcohol, there generally being used an excess of the alcohol over the amount theoretically required to form the ester. The reaction proceeds in some measure merely on heating the reactants together, and in the absence of a catalyst, though improved yields are obtained in the presence of a catalyst and when benzene or other appropriate solvent is used which is capable of both dissolving the reactants and forming an azeotrope with the water formed during the reaction. Suitable catalysts are the mineral acids, as sulfuric acid, hydrochloric acid, phosphoric acid, as well as organic acids of the type of p-toluene sulfonic acid and the like.

Another such method of preparing the ester is that of acid interchange, this method (described in U. S. Patent 2,245,131) being particularly useful in forming the vinyl ester compounds. Thus, vinyl p-tert-butylbenzoate is formed by reacting p-tert-butylbenzoic acid with vinyl acetate (inhibited by hydroquinone) in the presence of mercuric acetate and sulfuric acid as catalysts. Still another method of preparing esters is to react an appropriate halide with an acid salt.

When it is desired to prepare ester monomers by a practice of the foregoing method, it is obvious that precautions should be observed to prevent undue polymer formation, since many of the unsaturated compounds employed in forming the esters, as well as the esters themselves, are capable of ready polymerization. Thus, polymerization is minimized as the reaction is carried out for relatively short operating periods and at temperatures which are not above those required to effect the desired reaction. It is also advantageous in many cases to conduct the reaction in the presence of a polymerization inhibitor such as tannic acid or hydroquinone.

By whatever method produced, the monomeric ester product may be separated from the reaction mixture by fractional distillation under reduced pressure or by other suitable means, such as dissolving the acidic components of the reaction mixture in dilute sodium carbonate solution.

The compounds of the present invention possess a variety of unusual and unexpected properties which make them of considerable interest from the commercial standpoint. Thus, the various ester monomers are useful as insecticides either per se or as a component of various toxic compositions. Again, they form useful oil additives and impart extreme pressure qualities to lubricating oils. The polymers formed from such monomers also form an extremely useful group of compounds for which many important uses have already been demonstrated. For example, it is an important characteristic of the polymers (a term which includes both homopolymers as well as copolymers of the ester monomers) that they are compatible with numerous film-forming compounds, including nitrocellulose, polyvinyl chloride-acetate and linseed oil, and greatly improve the physical properties of the resulting films. Particularly beneficial results are obtained in the case of nitrocellulose films, for use of the presently disclosed polymers to supply part or all of their resinous content provides films of improved hardness, durability, adhesion and gloss as compared with nitrocellulose films prepared with the conventional alkyd or other resins.

The polymeric compounds of this invention are prepared either from the monomeric esters or directly from the raw materials used in the production of the esters, by methods known in the art. When homopolymers are prepared no other reactant compound is present, though in forming copolymers an appropriate unsaturated compound of the type discussed in the succeeding paragraph is employed. In general, the conditions leading to the formation of the homopolymers are the same as those whereby such esters are combined with other polymerizable materials to form copolymers, polymerization usually being effected in either case by the application of heat and/or with the addition of a catalyst.

The compounds which may be reacted with esters of the type described above to form the copolymers of this invention are those having at least one aliphatic group of two carbon atoms which are connected together by an olefinic linkage capable of undergoing addition polymerization. One important group of such co-polymerizable compounds is that containing in the molecule a single polymerizable olefinic linkage, as represented by styrene, the vinyl halides, the vinylidene halides, the vinyl esters of saturated monocarboxylic acids, methyl acrylate, methyl methacrylate, and the allyl halides and esters of saturated monocarboxylic acids. Another important group consists of unconjugated polymerizable compounds having in the molecule two or more non-conjugated polymerizable unsaturated linkages such as unsaturated aliphatic polyesters of saturated poly-basic acids, polyesters of saturated polyhydric alcohols with unsaturated organic acids, and esters of unsaturated alcohols with unsaturated aliphatic acids. Other polymerizable unsaturated compounds are those containing in the molecule one or more polymerizable organic radicals and one or more inorganic radicals or elements as exemplified by the vinyl, allyl and methallyl esters of phosphoric acid and of the ortho acids of silicon.

Another important group of co-polymerizable compounds consists of those having in the molecule two or more, preferably two, conjugated unsaturated polymerizable carbon-to-carbon linkages such as conjugated butadiene, conjugated chlorobutadiene, isoprene, the other conjugated pentadienes, the conjugated hexadienes, their homologues, analogues and suitable substitution products. A particularly valuable class of copolymers is that formed between ester compounds of the present invention and the allyl esters of aromatic polycarboxylic and ethereal oxygen-containing polycarboxylic acids, e. g. diallyl phthalate and diallyl diglycolate. Copolymers containing from about 5 to 98% by weight of the quaternary-substituted benzoic acid ester may be prepared, and preferred copolymers contain from about 25 to 75% by weight of such ester.

As has been noted above, the polymer compounds of the invention are preferably formed in the presence of a polymerization catalyst. Benzoyl peroxide has been found satisfactory for this purpose, as have acetyl peroxide, benzoyl acetyl peroxide, lauryl peroxide, dibutyryl peroxide, succinyl peroxide, sodium peroxide, barium peroxide, tertiary alkyl hydroperoxides such as tertiary butyl hydroperoxide, peracetic acid, perphthalic acid, sodium peroxide, perborates, persulfates, ozone and oxygen. The compounds may also be polymerized in the presence of their own peroxides, or of their ozonides. Another class of polymerization catalysts consists of the di(tertiary alkyl) peroxides, notably di(tertiary butyl) peroxide. Metals and metallic salts may be used as polymerization catalysts. If desired, mixtures of polymerization catalysts can be used, a suitable mixture being that of benzoyl peroxide and hydrogen peroxide. In some cases it may be desirable to conduct the polymerization in the concurrent presence of both a catalyst and an inhibitor of polymerization. The amount of peroxide catalyst used will ordinarily be between about 0.01% and about 5%, although it is not necessarily limited to this range.

Polymerization is usually energized by the application of heat, although both heat and light may be used, and in some cases, light alone may be sufficient. Temperatures of between about 60° C. and 250° C. are preferred, although somewhat higher or even lower temperatures can be used on occasion.

The monomeric compounds can be polymerized in the massive state or in the form of dispersions or solutions. Where a dispersion method is employed, it may be desirable to select a dispersing medium insoluble in the catalyst involved. With certain compounds polymerization can be effected in the vapor state. Continuous or discontinuous processes may be used, as may atmospheric, reduced, or superatmospheric pressures. Polymerization may also be carried out under a blanket of an inert gas.

The polymerization reaction can be carried to completion without substantial interruption or it can be stopped at any point short of completion with resultant formation of a partial polymer, i. e., a mixture of both monomer and polymer. This partial polymer mixture may be used as such, or the unreacted monomer may be separated from the mixture by solvent extraction, distillation or other method. The separated polymer may then be worked up in any known or special manner. In the case of many compounds, particularly in the case of the polymerization of compounds having two or more non-conjugated polymerizable unsaturated linkages in the molecule, the separated polymer may be capable of further polymerization.

The following examples illustrate the invention in various of its embodiments:

EXAMPLE I

Allyl p-tert-butylbenzoate was prepared by dissolving p-tert-butylbenzoic acid and allyl alcohol in an excess of benzene in the ratio of one mole of acid to 2 moles of alcohol, a quantity of about 0.5% by weight p-toluenesulfonic acid being added as catalyst. The resulting solution was refluxed until the distillate was substantially free of water. The reaction mixture was then subjected to fractional distillation under reduced pressure, allyl p-tert-butylbenzoate being recovered in the fraction boiling at from 128 to 140° C. at 0.5 mm. Hg. The yield of ester was 98% based on the amount of acid charged. The following table summarizes the properties of the ester:

Table I

PROPERTIES OF ALLYL P-TERT-BUTYLBENZOATE

Boiling point_____ 112° C. at 0.2 mm. Hg
Specific gravity $d_4^{20}$_____ .9943
Refractive index $n_D^{20}$_____ 1.5110
Saponification value_____ 0.459

EXAMPLE II

Vinyl p-tert-butylbenzoate was prepared by charging 1.12 moles of p-tert-butylbenzoic acid, 5.7 moles of commercial vinyl acetate (inhibited with hydroquinone), 3.5 grams of mercuric acetate and 0.5 cc. concentrated sulfuric acid into a reaction vessel where the mixture was refluxed for four hours, cooled and filtered. After washing with water the reaction mixture was fractionated, vinyl p-tert-butylbenzoate being recovered in yield of 81.2%, based on the amount of acid charged, as the fraction boiling at 100 to 105° C. at 0.5 mm. Hg. The properties of the ester may be summarized as follows:

Table II

PROPERTIES OF VINYL P-TERT-BUTYLBENZOATE

Boiling point_____ 100 to 105° C. at 0.5 mm. Hg
Specific gravity $d_4^{20}$__ 1.0029
Refractive index $n_D^{20}$. 1.5168

EXAMPLE III

Allyl p-tert-amylbenzoate was prepared from allyl alcohol and p-tert-amylbenzoic acid by the practice of a method similar to that described in Example I, the ester being obtained in a yield of 97% based on the amount of acid charged. The properties of the ester appear in Table III.

Table III

PROPERTIES OF ALLYL P-TERT-AMYLBENZOATE

Boiling point_____ 121° C. at 1 mm. Hg
Specific gravity $d_4^{20}$_____ 0.9948
Refractive index $n_D^{20}$_____ 1.5140
Saponification value_____ 0.439

EXAMPLE IV

Allyl p-tert-butylbenzoate was polymerized by bubbling air through the monomer maintained at 170° C. At the end of four hours the refractive index ($n_D^{20}$) of the composition was increased from 1.5110 to 1.5292, while in physical appearance the material was changed from a colorless, mobile liquid to a viscous, very light yellow-colored partial polymer. Removal of the volatile materials at reduced pressure (distillation being conducted to a vacuum of 0.5 mm. Hg at a kettle temperature of 175° C.) gave a 46% conversion of a brittle, light yellow-colored polymer having an ester value of 0.477 eq. per 100 grams. The polymer was soluble in acetone, benzene, butyl acetate, and chloroform, and insoluble in isopropyl alcohol. The polymer was found to be compatible in both a 1:1 as well as a 2:1 ratio with either nitrocellulose or polyvinyl chloride-polyvinyl acetate copolymer (VYHH), and in a 1:1 ratio with linseed oil both when hot (255° C.) as well as at room temperatures.

EXAMPLE V

In this operation 10 grams of allyl p-tert-butylbenzoate and 0.5 gram benzoyl peroxide were heated together at 60° C. for 5 hours and then at 95° C. for 65 hours. While the allyl p-tert-butylbenzoate monomer was a relatively non-viscous liquid, the viscosity had greatly increased at the end of 22 hours and still more at the conclusion of the 70-hour heating period, when the mass was found to be highly viscous.

An operation under the same conditions as described in the preceding paragraph was then conducted using 5 grams allyl p-tert-butylbenzoate and 5 grams diallyl phthalate along with 0.3 gram benzoyl peroxide. In this case the mixture was found to gel after 22 hours' heating and was converted into a soft solid at the end of the 70 hours.

EXAMPLE VI

Vinyl p-tert-butylbenzoate was polymerized by heating 10 grams of the ester monomer with 0.2 gram benzoyl peroxide for 5 hours at 60° C. and then for 65 hours at 95° C. At the end of 3 hours' heating the original water-white liquid had jelled. It was solid after 22 hours' heating, and extremely hard and brittle at the end of the test period.

A companion operation using the same conditions as described in the preceding paragraph was then conducted with 5 grams of vinyl p-tert-butylbenzoate and 5 grams diallyl phthalate, together with 0.3 gram benzoyl peroxide as catalyst. In this case the jell obtained after 22 hours' heating was converted into a hard, non-brittle solid having a Barcol hardness of 35 to 40 at the end of the 70-hour heating period.

It also forms an important feature of the present invention to provide improved coatings wherein the polymers of the invention (including homo- as well as copolymers) are compounded with a material capable of drying to form a solid film, representative materials of the latter variety being nitrocellulose, polymeric vinyl esters such as vinyl chloride-vinyl acetate copolymers, or natural drying oils such as linseed oil, and optionally with a plasticizing ingredient, as dibutyl phthalate and one or more of various pigments, extenders, fillers and like inert materials as required. Such coatings are normally applied in solution form, in which case the composition will also include one or more volatile solvents such as methyl ethyl ketone, ethanol, isopropanol, xylene, toluene or ethyl acetate. In formulating these compositions, the above described polymers may comprise from about 20 to 80% of the combined weight of the polymer and the film-forming agent.

The coatings of the present invention are superior to many of the coatings now available in the art. Thus, the present coatings are considerably harder in both the hot as well as the cold condition than are those wherein the resinous ingredient is supplied by an alkyd or other conventional resin. Further, our coatings have improved adherence qualities and manifest particularly good resistance against blistering and whitening on exposure to water as well as against deterioration under adverse conditions of atmospheric exposure. Another important advantage of the present coatings is that they may be sanded or otherwise worked within a short time after application.

The following examples are also illustrative of the present invention:

EXAMPLE VII

In this operation companion nitrocellulose solutions were prepared by mixing 1 part of nitrocellulose with 1 part of resin and 0.2 part dibutyl phthalate, the resulting mixture then being dissolved in a solvent made up of n-butyl acetate, ethanol and xylene to form a 16.5% solution. In the one case the resin employed was an alkyd resin, specifically "Rezyl 99-5" a product of the American Cyanamid Company, whereas in the other case the resin was a polymer of allyl p-tert-butylbenzoate. The latter material was prepared by heating allyl p-tert-butylbenzoate along with 2% by weight di-(tert-butyl)-peroxide at temperatures between 100° C. to 120° C. for 30 hours and then distilling the volatile components from the resulting partial polymer solution under reduced pressure, the pressure being maintained at 0.5 mm. Hg with a kettle temperature of 150° C. for ½ hour at the end of the distillation. The resulting polymer, obtained in 84.2% yield, was a brittle amber-colored product softening at approximately 100° C. as measured by the ring and ball test. Films were formed from each of these solutions by painting the same on bare glass surfaces, other films being prepared in a like manner, but on steel surfaces previously provided with a primer coat of Red Chromate (Berry Bros. No. 25, a mixture of zinc yellow and iron oxide).

The films containing the benzoate polymer proved superior in every respect to those compounded with alkyd resins. Thus, the Sward hardness of the former was 63 whereas that of the latter was only 51. Likewise, application of a cotton duck fabric under a pressure of 5 lbs. per square inch for several hours to the films at 130° F. failed to mark the benzoate polymer-containing films whereas the others bore the imprint of the fabric. The films were then immersed in water at 120° F. The unprimed alkyd resin-containing film blistered in 24 hours and exhibited bad whitening after 164 hours. The latter condition was still bad after a recovery period of 24 hours in air. The primed alkyd resin film blistered in 48 hours and was slightly whitened after 164 hours in the water, as well as at the end of the 24 hour recovery period. On the other hand, the films prepared with a benzoate polymer did not blister after 164 hours in the case of the unprimed film and 72 hours in the case of the primed film, and while both gave slight evidence of whitening after 164 hours in the water, this condition had completely disappeared at the end of the 24 hour recovery period.

EXAMPLE VIII

Films were prepared on glass from solutions of the same composition as described in Example VII above, but without the addition of dibutyl phthalate. The films were dried in air for 1 hour and were then immediately sanded. In the case of the alkyd resin film, the sand paper was found to clog almost immediately, whereas the film compounded with the benzoate polymer presented such a hard surface that it could be vigorously sanded without evidencing any clogging of the paper.

The invention claimed is:
1. Allyl p-tert-butylbenzoate.
2. Vinyl p-tert-butylbenzoate.
3. Allyl p-tert-amylbenzoate.
4. A polymer of allyl p-tert-butylbenzoate.
5. A polymer of vinyl p-tert-butylbenzoate.
6. A polymer of allyl p-tert-amylbenzoate.
7. A copolymer of allyl p-tert-butylbenzoate with another polymerizable organic compound having an aliphatic group of two carbon atoms which are connected together by an olefinic linkage capable of undergoing addition polymerization.
8. A copolymer of vinyl p-tert-butylbenzoate with another polymerizable organic compound having an aliphatic group of two carbon atoms which are connected together by an olefinic linkage capable of undergoing addition polymerization.
9. A compound having the structural formula

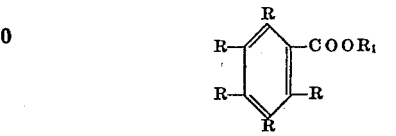

wherein one of the R's is a tertiary butyl radical, and the remaining R's are members selected from the group consisting of hydrogen atoms and alkyl radicals, and wherein R₁ is an alkenyl radical containing from 2 to 4 carbon atoms.
10. A polymer of a compound of claim 9.
11. A copolymer of a compound of claim 9 with another polymerizable organic compound having an aliphatic group of two carbon atoms which are connected together by an olefinic linkage capable of undergoing addition polymerization.
12. A copolymer of allyl p-tert-butylbenzoate with diallyl phthalate.
13. A copolymer of vinyl p-tert-butylbenzoate with diallyl phthalate.
14. A composition of matter comprising a polymer of allyl p-tert-butylbenzoate together with nitrocellulose.
15. A composition of matter comprising a material capable of drying to form a solid film together with a polymer of a compound having the structural formula

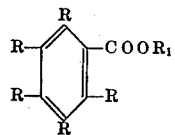

wherein one of the R's is a tertiary butyl radical, and the remaining R's are members selected from the group consisting of hydrogen atoms and alkyl radicals, and wherein $R_1$ is an alkenyl radical containing from 2 to 4 carbon atoms.

16. The composition of claim 15 wherein there is added a plasticizing ingredient and a volatile solvent.

17. The composition of claim 15 wherein the film-forming material is nitrocellulose.

18. The composition of claim 15 wherein the film-forming material is a polymeric vinyl ester.

19. The composition of claim 15 wherein the film-forming material is a natural drying oil.

JAMES R. SCHEIBLI.
RUPERT C. MORRIS.
EDWARD C. SHOKAL.

REFERENCES CITED

The following references are of record in the file of this patent:

UNITED STATES PATENTS

| Number | Name | Date |
|---|---|---|
| 2,332,896 | D'Alelio | Oct. 26, 1943 |
| 2,332,900 | D'Alelio | Oct. 26, 1943 |

FOREIGN PATENTS

| Number | Country | Date |
|---|---|---|
| 395,478 | Great Britain | July 20, 1933 |

OTHER REFERENCES

Marvel et al.: Journ. Amer. Chem. Soc., vol. 66, pp. 914–918 (1944).